March 4, 1941. P. A. E. ARMSTRONG Re. 21,733

METHOD OF FORMING ALLOYS

Original Filed May 8, 1928 2 Sheets-Sheet 1

INVENTOR
Percy A. E. Armstrong
BY
Cruse & Haim
ATTORNEYS

March 4, 1941. P. A. E. ARMSTRONG Re. 21,733

METHOD OF FORMING ALLOYS

Original Filed May 8, 1928 2 Sheets-Sheet 2

INVENTOR
Percy A. E. Armstrong
BY Cruse & Maun
ATTORNEYS

Reissued Mar. 4, 1941

Re. 21,733

UNITED STATES PATENT OFFICE 21,733

METHOD OF FORMING ALLOYS

Percy A. E. Armstrong, Westport, Conn.

Original No. 1,781,490, dated November 11, 1930, Serial No. 276,012, May 8, 1928. Application for reissue June 12, 1940, Serial No. 340,230

11 Claims. (Cl. 75—10)

This invention relates to a method of forming ferrous alloys and articles such as valves and tappets which are in part made of such alloys; and is based upon my discovery that iron and various alloying ingredients can be melted by the use of the electric arc in a metal crucible which has a lower melting point than the material to be melted, but which has a substantially high factor of heat conductivity.

Figure 1:
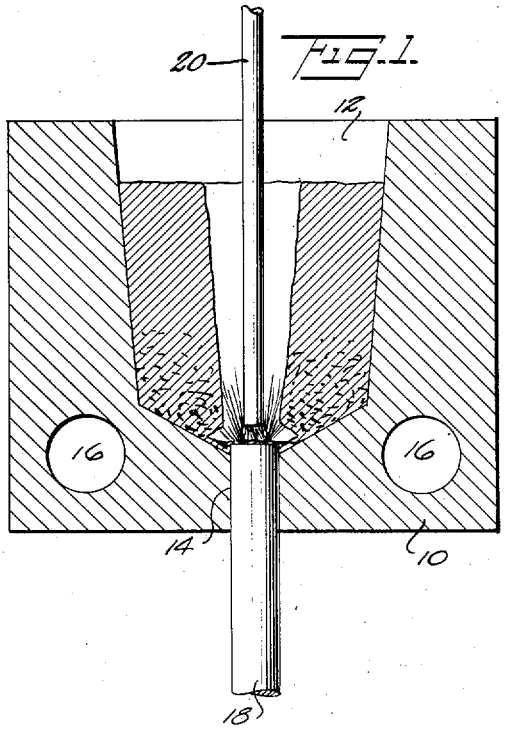
Figure 2:
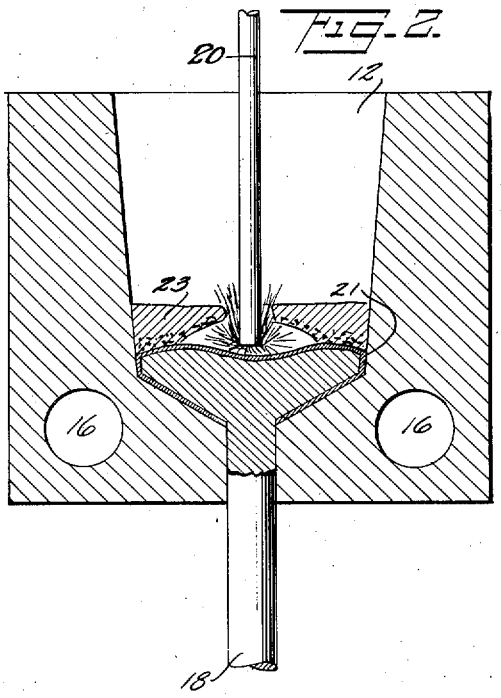
Figure 3:
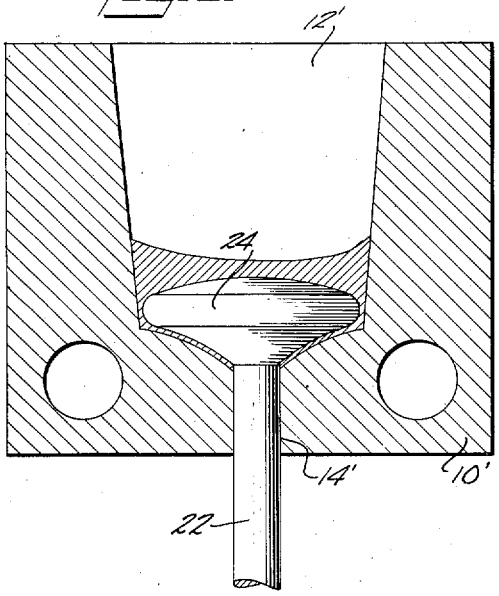
Figure 5:
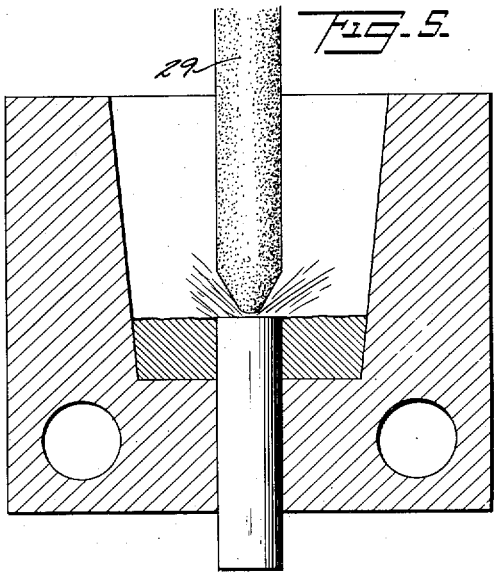
Figure 6:
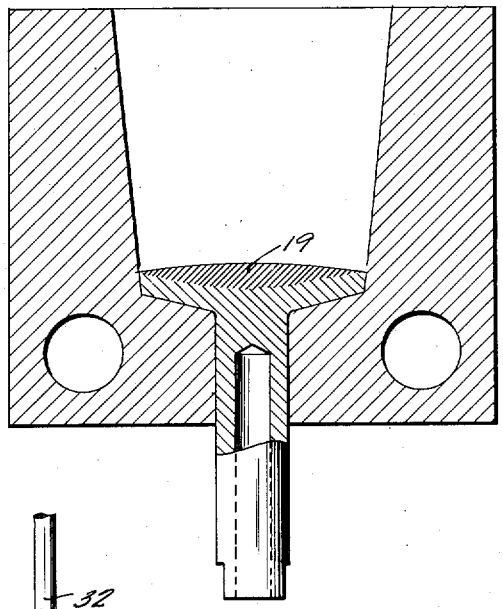

For the purposes of illustration, reference is had to the accompanying drawings in which Fig. 1 is a sectional view through a crucible embodying my invention at an early stage in the operation; Fig. 2 is a similar view further along in the process; Fig. 3 shows the device as applied to the manufacture of a tappet and Fig. 5, shows a modification. Fig. 6 illustrates a modification of the invention wherein an uneven distribution of elements is obtained.

In the examples illustrated, a block of copper 10 has formed in it a cavity 12 of any desired shape, from the bottom of which extends an opening 14 in this instance of substantially smaller diameter than the cavity 12. If desired, the block 10 may be supplied with openings 16 through which water or other cooling medium may be passed. A ferrous electrode 18 is pushed up so that its end extends somewhat above the bottom of the cavity 12 and the metallic elements to be melted together with slag forming ingredients are put in the cavity 12 and pushed to the sides as indicated in Fig. 1. A second ferrous electrode 20 is put down through the opening thus formed, and an arc started between the two electrodes. It is to be understood that proper electrical connections not here shown are made to the two electrodes. The preferred line voltage is about 100 and with a top electrode one quarter inch in diameter a current of about 500 amperes—either alternating or direct—should be used. Immediately the arc is formed, portions of the electrodes 18 and 20 will melt, and at the same time the added metal elements and slag forming ingredients will start to melt with the slag floating on top of the metal. As the amount of molten metal increases, the slag is pushed ahead of it, but to the high heat conductivity of the copper block the slag is cooled upon contacting with the copper, thus forming a lining 21 for the crucible which prevents the copper from melting. The unmelted slag which more or less sinters together acts as a roof to the molten metal as shown at 23, and the roof effect remains until all the slag is melted. This to a large degree prevents oxidation of the melt and keeps the heat deflected down onto the growing pool of metal in the crucible. The arc is also maintained in a slag atmosphere which beside protecting the molten metal as it goes across the arc, enables the arc to be very readily maintained. The electrode 20 is gradually pushed down and continues to melt from the heat of the arc, but only a small portion of the electrode 18 will melt, due to the cooling action of the copper block which surrounds it. It is to be understood that in this example the electrode 20 will supply part of the base content to the alloy which will usually be iron, or if desired the electrode 20 itself can be made of an alloy or may carry or have attached to it, either internally or externally, alloys or alloying elements or slag, or all of these ingredients. The electrode 20 may be so arranged that the molten metal can be stirred by immersing the electrode in the molten metal and moving this electrode, but ordinarily this will not be necessary because of the natural agitation of the metal due to the action of the arc. In some instances it may even be desirable to reduce the flow of current and thus reduce this agitation, so that one may obtain an uneven distribution of elements with the upper central part formed predominantly from the electrode, as indicated at 19 in Fig. 6.

When all of the metal elements that were introduced into the cavity 12 have been melted and a pre-determined portion of the electrode 20 has been melted, electrode 20 is withdrawn and the mass allowed to solidify. Upon solidifying a blow on the electrode 18 will drive out the resulting slug of metal which is firmly united to the electrode 18. If the crucible is simply being used for test purposes, the electrode 18 can then be cut off.

Figure 4:
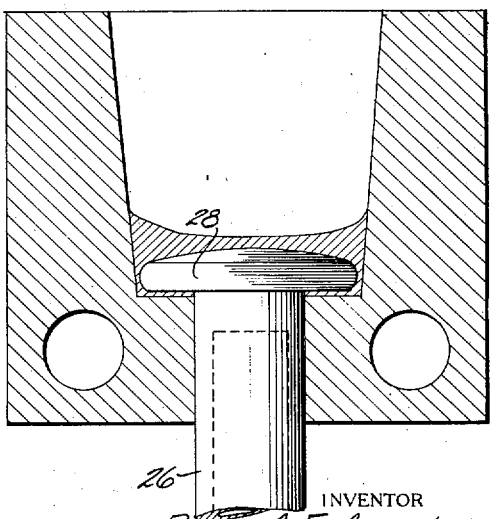

While this method of melting metallic ingredients (including ores) is very useful for laboratory purposes, it also lends itself to commercial uses, particularly where it is desired to manufacture an article only part of which need be made of alloy steel, or of which a part must be machined, or where the enlarged or reduced portion can be finished or formed by the minimum amount of forging or other forming. Thus in Fig. 3, I illustrate the manufacture of valves. The stem 22 is first formed to the finished shape and inserted in the opening 14' of the copper mold 10'. The bottom of the cavity 12' is shaped to conform to the shape of the desired valve head. In this case the stem 22 serves the same function as the electrode 18 and enough metal is melted in the cavity 12' to form the valve head 24 which may have a rounded upper surface as shown, due to the chilling effect of the copper block on the outer portions of the upper layer of the slag, tending to retard the rising slag layer except in the top centre portion; or if desired, the top surface of the melt can be dished by suitable changes in the relative melting point of the slag. After the molten metal has solidified, the piece is knocked out of the mold and if desired ground or otherwise formed to shape. In similar fashion, I show in Fig. 4 the manufacture of a tappet having a hollow stem 26 and a head 28.

By utilizing the methods here shown it is possible to make valves or tappets or other like parts having the head formed of ferrous alloy and the stems formed of the same or different grade of ferrous alloy or steel, or to utilize in the formation of such head alloys which would not readily lend themselves to forging, for the metal which solidifies in the crucible cavity forms, together with the fused and partly fused end of the stem, which is in effect an integral casting, even though the body of the stem may previously have been forged or otherwise shaped, and may retain the characteristics resulting from such treatment. In this connection, it may be noted that the slag lining which has formed in the mold cavity is relatively thin and of substantially uniform thickness so that after the metal has solidified, the slag comes out freely with the metal shape. After this shape has cooled, the slag layer can usually be separated from the metal quite readily as by striking the metal a sharp blow, because of the sharp line of cleavage between the two, which is emphasized by their different degrees of shrinkage.

If desired, a graphite electrode may be substituted for the ferrous electrode 20. Such an arrangement is illustrated in Fig. 5. Here the bottom electrode is pushed up further than in the case illustrated in Fig. 7 so that more of it may melt to start the pool of molten metal. The arc may then be maintained by moving the graphite electrode 29 so that it remains a proper distance from the surface of the metal. The slag forming ingredients together with alloying ingredients, when used, are packed around the lower electrode. If it is desired to produce an article with an upper surface relatively high in carbon, the current flow may be adjusted so that there is little or no agitation of the melted metal which will be carbonized by decomposition of the electrode 29; or preferably, after the metal has been melted the graphite electrode 29 is pushed down into the upper part of the melt and moved around so that the upper strata becomes relatively highly carbonized. If it is desired to increase the difference in composition between various parts of the mass, the arc may be momentarily broken, allowing the metal to become less fluid or even to solidify adjacent the crucible walls, after which the arc is again formed and, if necessary, the electrode submerged as stated. This will be particularly desirable where the edges as well as the under surface should be left uncarbonized as in the case of a tappet. This same procedure may even be applied to a previously formed or partly formed member which may be inserted in a crucible of high heat conductivity and then can be melted and carbonized on its upper surface by the use of a graphite electrode. In such case it will be desirable to put a small amount of slag forming material in the crucible under the body to be treated in addition to that which is used to cover the upper surface, for there is a possibility that substantially all of the head forming metal will be brought to a more or less fluid state, though the lower and marginal portions will be much less fluid than the upper middle portions, or even remain solid. In any event there will be a gradual variation in the degree of carbonization instead of the clear line of demarcation which is obtained for example by adding carbonized metal through arc welding.

Figure 7:
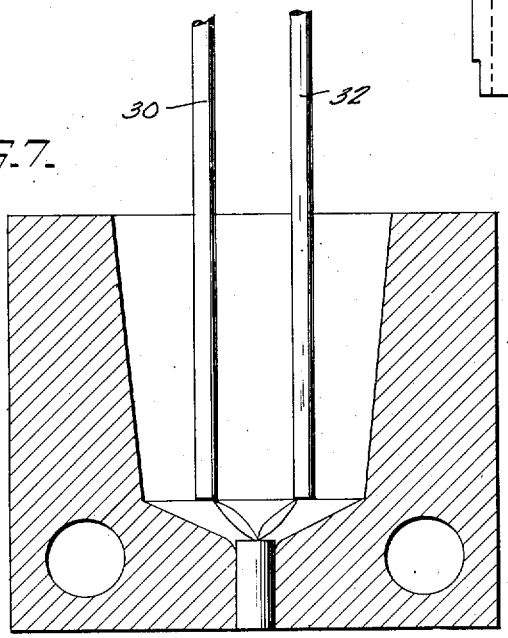

In Fig. 7 I show a modification adapted primarily for a three-phase current in which two upper electrodes 30 and 32 are employed in place of the one upper electrode 20. If desired, this arrangement with two electrodes may be used with two-phase current without any connection being made to the bottom electrode; or the bottom electrode may be omitted and the metallic crucible may be made without any hole in the bottom, in which case the melt may be made by melting the metals and slag by heat agency of the electric arc between electrodes such as the electrodes 30 and 32. In this case the melt may be poured out of the crucible into a suitable mold or other receptacle. Some of the slag will pour out with the metal and any residue in the crucible may, when desired, be removed after the crucible is cool.

I refer to the mold or block as being made of copper but it is to be understood that other metals with substantially high heat conductivity can be used, though copper or some of the copper alloys are the most readily available materials. It is further to be understood that in commercial production of articles such as valves or tappets one block may contain a large number of mold cavities. In such cases artificial cooling will ordinarily be necessary, as by passing water through the openings 16, though it is in no way essential that the mold or block have a melting point below the temperature to which the melted metal is to be heated. However, as the use of the relatively low melting point block is possible such use ordinarily is economical.

What I claim is:

1. The method of melting metals in a metallic crucible having a lower melting point than that to which the melted metal is raised, which comprises the steps of exposing metallic ingredients intermixed with slag forming ingredients to the heat of an electric arc initiated near the bottom of a metallic crucible, while permitting heat to dissipate from the walls of the crucible, whereby a protective slag lining for the crucible is formed progressively as the volume of molten metal increases.

2. The method of producing a melt of ferrous materials which comprises the step of exposing the materials to be melted, together with slag forming ingredients, to the heat of an electric arc in a metallic crucible which has metallic inner walls and is adapted to disseminate heat rapidly.

3. A method as specified in claim 2, in which the crucible has metallic inner walls and a bottom portion comprising a body of ferrous metal, and in which such body of ferrous metal forming a bottom portion of the crucible is employed as one electrode of the arc whereby a portion of such ferrous body is fused with the additional materials melted in the crucible, and in which the melted metal is allowed to solidify within the said metallic walls under a layer of slag so that the melted metal and said body of ferrous metal unite to form a substantially integral whole.

4. A method as specified in claim 2 in which the crucible has metallic inner walls and a bottom portion comprising a body of ferrous metal and in which such body of ferrous metal forming a bottom portion of the crucible is employed as one electrode of the arc whereby a portion of such ferrous body is fused with the additional materials melted in the crucible beneath a layer of the slag-forming ingredients and such slag-forming ingredients form a protective layer between the molten metal and the crucible walls, and in which the melted metal is allowed to solidify within said crucible walls under such layer of slag so that the melted metal and said body of ferrous metal unite to form a substantially integral whole readily separable from said metallic walls.

5. A method as specified in claim 2, in which the crucible has metallic inner walls and a bottom portion comprising a body of ferrous metal and in which such body of ferrous metal forming a bottom portion of the crucible is employed as one electrode of the arc whereby a portion of such ferrous body is fused with the additional materials melted in the crucible, and such additional materials comprise elements adapted to be melted to form a ferrous alloy of different analysis from said ferrous body, and in which the melted metal is allowed to solidify within the said metallic walls under a layer of slag so that the melted metal and said body of ferrous metal unite to form a whole which is substantially integral though of non-uniform analysis.

6. A method as specified in claim 2, in which the crucible has metallic inner walls and a bottom portion comprising a body of ferrous metal and in which such body of ferrous metal forming a bottom portion of the crucible is employed as one electrode of the arc whereby a portion of such ferrous body is fused with the additional materials melted in the crucible, and in which the other electrode is movable and carries alloying elements adapted to melt to form a ferrous alloy of different analysis from said ferrous body, and in which the melted metal is allowed to solidify within the said metallic walls under a layer of slag so that the alloy metal and said body of ferrous metal unite to form a substantially integral whole.

7. The method of melting metal to form alloys which comprises simultaneously melting the metallic elements and slag forming ingredients in a metallic crucible of high heat conductivity by the action of an electric arc, using at least one metallic electrode, whereby a substantial portion of such electrode is melted and serves to increase the amount of molten metal in the crucible.

8. A process as defined in claim 7, in which a second electrode is embedded in the crucible and at its end is fused with the molten metal, and the molten metal is allowed to solidify in conjunction with such second electrode whereby the previously molten metal and the electrode are formed into an integral whole.

9. The method of melting metal which comprises the steps of positioning a ferrous metal body in a metallic crucible of high heat conductivity, conducting electricity to a portion of such metal body extending through the metallic crucible and melting metal of such body in the presence of slag-forming material by the action of the electric arc by using such metallic body as one electrode.

10. The method of melting ferrous metal which comprises the steps of positioning a metallic body comprising ferrous metal in a metallic crucible of high heat conductivity, forming an electric arc with such metallic body as one electrode and melting a portion of the ferrous metal of such body within the crucible by the heat of such electric arc and in the presence of material adapted to form a slag for the melted metal.

11. A process as defined in claim 10 in which the molten metal is allowed to solidify in conjunction with the unmelted portion of said metallic body whereby previously molten metal and said metallic body are formed into an integral whole.

PERCY A. E. ARMSTRONG.